(12) United States Patent
Jack et al.

(10) Patent No.: US 9,221,511 B2
(45) Date of Patent: Dec. 29, 2015

(54) FLEXIBLE HANDLEBAR BAG

(71) Applicant: R2 Design Lab, Inc., Schaumburg, IL (US)

(72) Inventors: Robert C. Jack, Schaumburg, IL (US); Ryan D. Jack, Schaumburg, IL (US)

(73) Assignee: R2 DESIGN LAB, INC., Schaumburg, IL (US)

( * ) Notice: Subject to any disclaimer, the term of this patent is extended or adjusted under 35 U.S.C. 154(b) by 225 days.

(21) Appl. No.: 13/826,622

(22) Filed: Mar. 14, 2013

(65) Prior Publication Data

US 2014/0263508 A1    Sep. 18, 2014

(51) Int. Cl.
*B62J 9/00*    (2006.01)
*B62J 7/06*    (2006.01)

(52) U.S. Cl.
CPC .... *B62J 9/003* (2013.01); *B62J 7/06* (2013.01)

(58) Field of Classification Search
CPC ...................................................... B60R 7/005
USPC ......... 224/412, 420, 431–432, 440, 418, 441, 224/448, 437, 438, 446, 451, 454, 919; 220/9.1–9.4; 383/2, 4, 43, 68, 46, 49; D3/229, 257; 206/315.9; 248/95, 99; 150/118, 120
See application file for complete search history.

(56) References Cited

U.S. PATENT DOCUMENTS

| | | | | |
|---|---|---|---|---|
| 597,395 | A * | 1/1898 | De Kay | 383/74 |
| 599,119 | A * | 2/1898 | Coolidge | 224/438 |
| 2,765,833 | A * | 10/1956 | Kwon | 150/107 |
| 4,988,216 | A * | 1/1991 | Lyman | 383/74 |
| 6,105,305 | A * | 8/2000 | Edens | 43/54.1 |
| 7,575,675 | B2 * | 8/2009 | Gopalan | 210/167.1 |
| 2004/0208397 | A1 * | 10/2004 | Yi | 383/15 |
| 2012/0187169 | A1 * | 7/2012 | Osten et al. | 224/414 |

OTHER PUBLICATIONS

Wire Bike Basket with Clip-On Bracket, $29.00 [online]. Walmart.com [Retrieved on Mar. 6, 2013]. Retrieved from the Internet: <URL:http://www.walmart.com/ip/11065170?wmlspartner=wlpa&adid=22222222227000000000&w10=& . . . >, 1 page.
Schwinn Delmar Men's Collapsible Handlebar Basket, Model No. SW76661-2, Walmart No. 550138946, $16.10 [online]. Walmart.com [Retrieved on Mar. 6, 2013]. Retrieved from the Internet: <URL:http://www.walmart.com/ip/Schwinn-Delmar-Men-s-Collapsible-Handlebar-Basket/19593692?find . . . >, 1 page.

(Continued)

*Primary Examiner* — Justin Larson
*Assistant Examiner* — Phillip Schmidt
(74) *Attorney, Agent, or Firm* — Thomas E. Williams; Neal, Gerber & Eisenberg LLP

(57) ABSTRACT

A carrier apparatus is disclosed for attachment to a bicycle to carry a number of items including sporting good items. In one embodiment, the apparatus includes a receptacle suspended from a fixed rear support and a movable front support. The receptacle includes a panel having a rear end connected to the rear support and a front end connected to the front support to cause the receptacle to be suspended therefrom. The apparatus includes a resilient member connecting the front support to the rear support, wherein the front support is tetheringly movable toward and away from the rear support to vary the opening and closing of the receptacle to receive and thereafter secure therein a plurality of differently sized items.

23 Claims, 12 Drawing Sheets

(56) References Cited

OTHER PUBLICATIONS

Schwinn Front Quick-Release Collapsible Bike Basket, Model No. SW76540-2, Walmart No. 550138952, $21.97 [online]. Walmart.com [Retrieved on Mar. 6, 2013]. Retrieved from the Internet: <URL:http://www.walmart.com/ip/Schwinn-Front-Quick-Release-Collapsible-Bike-Basket/19593676?fin . . . >, 1 page.

Bell Folding Bike Basket, Model No. 1006604, Walmart No. 070085149, $19.96 [online]. Walmart.com [Retrieved on Mar. 6, 2013]. Retrieved from the Internet: <URL:http://www.walmart.com/ip/17254777?wmlspartner=wlpa&adid=22222222227000000000&w10=& . . . >, 1 page.

Wire Bike Basket, $14.00 [online].Walmart.com [Retrieved on Mar. 6, 2013]. Retrieved from the Internet: <URL:http://www.walmart.com/ip/Wire-Bike-Basket/11065171>, 1 page.

Sunlite Standard Deep Bicycle Basket, Chrome, 14"×9"×9", $15.28 [online]. Amazon.com [Retrieved on Mar. 6, 2013]. Retrieved from the Internet: <URL:http://www.amazon.com/Sunlite-Standard-Bicycle-Basket-Chrome/dp/ B000YBCMHE/ref=sr_1_1? . . . >, 1 page.

Topeak Basket—Front, Item #780116, $39.95 [online]. Rei.com [Retrieved on Mar. 6, 2013]. Retrieved from the Internet: <URL:http://www.rei.com/product/780116/topeak-basket-front>, 1 page.

Avenir Quick Bike Basket, $25.45 [online]. Amazon.com [Retrieved on Mar. 6, 2013]. Retrieved from the Internet. <URL: http://www.amazon.com/Avenir-Quick-Bike-Basket-Black/dp/B001V687QG/ref=sr_1_1?ie=UTF8 . . . >, 1 page.

Snoozer Bike Basket, 10"×10"×13", $69.95 [online]. Shoebuy.com [Retrieved on Mar. 6, 2013]. Retrieved from the Internet. <URL:http://www.shoebuy.com/snoozer-bike-basket/338098>, 1 page.

Avenir Flower Bike Basket, $10.35 [online]. Afterschool.com [Retrieved on Mar. 6, 2013]. Retrieved from the Internet: <URL:http://www.afterschool.com/p/avenir-flower-bike-basket-381956?site=CA&utm_source=Google&u . . . >, 1 page.

Nantucket Cisco D-Shaped Front Handlebar Bike Basket, 14.5"×10.5"×9.5", $29.99 [online]. Amazon.com [Retrieved on Mar. 6, 2013]. Retrieved from the Internet. <URL:http://www.amazon.com/Nantucket-Cisco-D-Shaped-Handlebar-Basket/dp/B006WIM9ZU>, 1 page.

* cited by examiner

FLEXIBLE HANDLEBAR BAG

BACKGROUND

This application relates generally to the field of devices for carrying items, and in at least one embodiment to apparatuses and methods for carrying items on a bicycle.

SUMMARY

A carrier apparatus for attachment to a bicycle is disclosed, comprising a flexible receptacle including a flexible panel having a first end and a second end. The first end is connected to a first support and the second end connected to a second support. The panel is suspended from the first and second supports. The carrier apparatus also includes a resilient member connecting the second support to the first support, where the second support is tetheringly movable toward and away from the first support to vary an opening of the receptacle.

The receptacle may be configured to respond to motion of the bicycle so as to maintain the carrying of any items by the receptacle during use. The panel may include a net having a plurality of apertures where at least a portion of the apertures is smaller than a diameter of a golf ball.

The first support and the second support may each include a curved portion that connects a flange positioned at respective ends of the first support and the second support. The curved portion of the first support and the curved portion of the second support may be oriented outwardly and in opposite directions to one another. A minimum opening to the receptacle may be formed by the respective curved portions of the first and second supports when respective flanges of the first support are positioned adjacent to respective flanges of the second support via the resilient member. The curved portion of the second support may include a reflector positioned along an outer surface of the curved member for enhancing rider safety during use. The reflector may reflect light within at least a subtending angle corresponding to an arc length of the reflector on the curved member.

The carrier apparatus may include a second resilient member attached to each of the flanges of the first support for releasably and adjustably securing an item to and longitudinally along the first support.

The carrier apparatus may include at least one bracket cantileverly extending from and supporting the first support to provide clearance between the receptacle and the bicycle during use. The carrier apparatus may include a clamp releasably connected to and supporting the at least one bracket. The clamp may include a first quick-release mechanism for quickly mounting and demounting the at least one bracket, and a second quick-release mechanism for quickly mounting and demounting the clamp to and from the bicycle. The clamp may include a clamshell having a top portion and a bottom portion for securely mounting to the bicycle.

The carrier apparatus may include a slab of hook and loop fastener material movably positioned along adjacent side edges of the first and second panels of the receptacle. The slab of hook and loop fastener material may connect a side edge of the first panel with an adjacent side edge of the second panel to form a side wall portion of the receptacle.

In another embodiment, a carrier apparatus for attachment to a bicycle is disclosed comprising a first panel suspended from a first support that is adapted to be cantileverly connected to the bicycle, and a second panel suspended from a second support opposite the first support. The second panel is connected to the first panel. The first panel and the second panel comprise a receptacle for carrying an item. The carrier apparatus includes a resilient member connecting the second support to the first support, where the second support is tetheringly movable toward and away from the first support to variably open and close the receptacle.

The receptacle may move in tandem with the item being carried in response to motion induced by the bicycle during use so as to maintain the carrying of the item by the receptacle. The receptacle may include at least one substantially open side between the first panel and the second panel. The resilient member may include a cinch for selectively shortening and lengthening a position of the second support relative to the first support.

In another embodiment, a carrier apparatus for attachment to a bicycle is disclosed in which the carrier apparatus is configured to hold a plurality of items. The carrier apparatus includes a receptacle suspended from a fixed rear support and a movable front support. The receptacle includes a panel having a rear end connected to the rear support and a front end connected to the front support to cause the receptacle to be suspended therefrom. The carrier apparatus also includes a cord member connecting the front support to the rear support where the front support is tetheringly movable toward and away from the rear support. Owing to its flexibility and regardless of whether the receptacle has closed side ends, the receptacle moves in tandem with any items contained or held by the receptacle in response to motion of the bicycle so as to maintain the carrying of the items by the receptacle during use.

The carrier may include a resilient member attached to the rear support. The resilient member may include a cinchable loop for releasably and adjustably securing a sporting goods item to the rear support.

DETAILED DESCRIPTION

Although the figures and the instant disclosure describe one or more embodiments of a carrying apparatus for use on a bicycle, one of ordinary skill in the art would appreciate that the teachings of the instant disclosure would not be limited to these embodiments.

Figure 1:
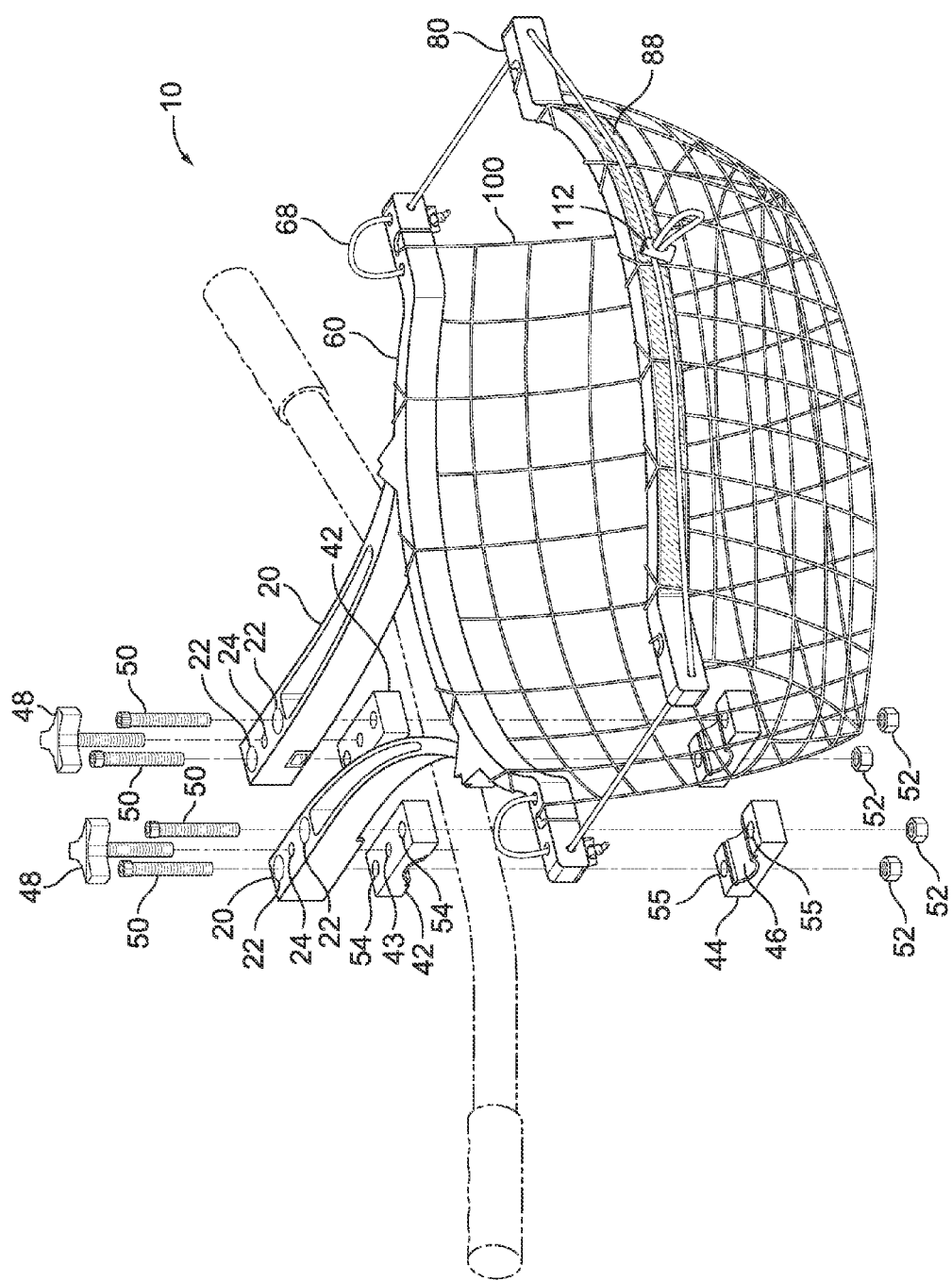
FIG. 1 illustrates an exploded front perspective view of an embodiment of a handlebar bag apparatus with the handlebar bag apparatus in a partially open position.
Figure 2:
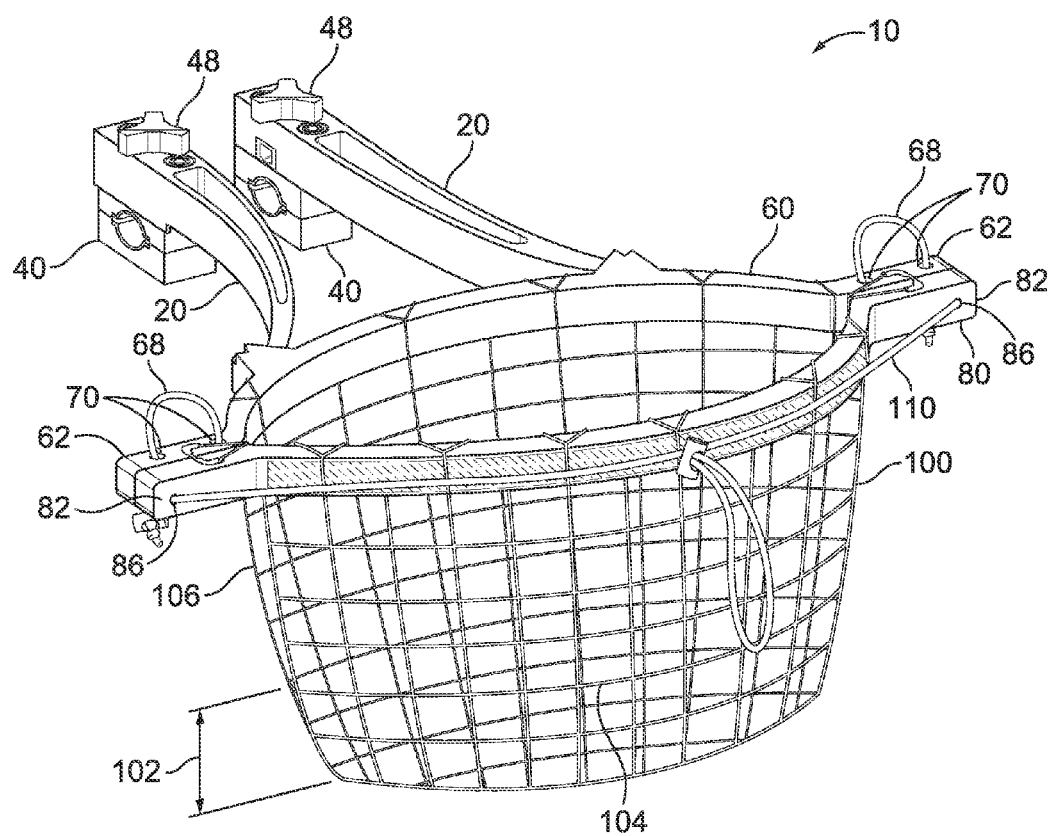
FIG. 2 illustrates a front perspective view of the handlebar bag apparatus of FIG. 1 in a closed position.
Figure 3:
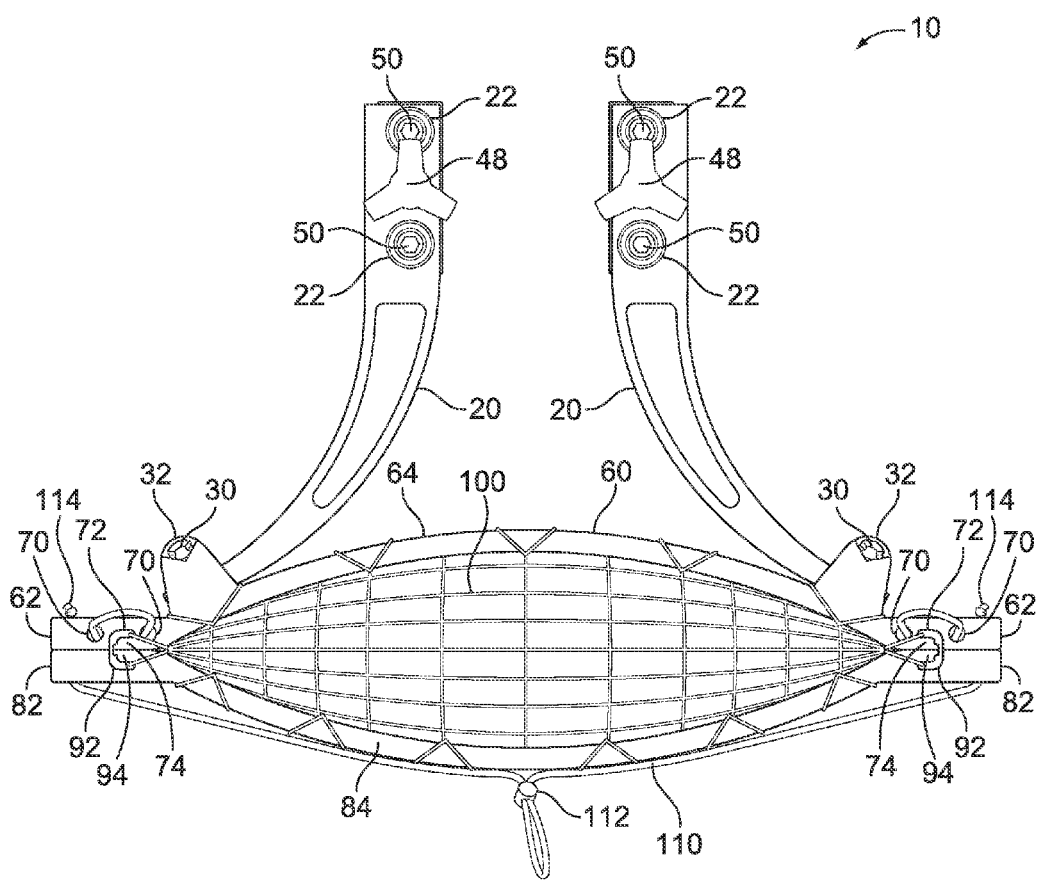
FIG. 3 illustrates a top view of the of the handlebar bag apparatus of FIG. 2.

Turning now to the figures, wherein like reference numerals refer to like elements, there is shown an exemplary handlebar bag apparatus 10 for use in carrying a variety of objects on a bicycle. As shown in FIGS. 1-3, handlebar bag apparatus 10 includes one or more arms 20 extending from one or more clamps 40. Handlebar bag apparatus 10 further includes rear bracket 60, front bracket 80, bag 100, and cord 110. In one embodiment, clamps 40 may be configured to be secured to the handlebars of a bicycle. As will be appreciated by one of ordinary skill, certain aspects of handlebar bag apparatus 10 may be mounted to other aspects of a bicycle, such as the frame of the bicycle, instead of the handlebars.

Arms 20 may be removably mounted to and forwardly extend from clamps 40. Arms 20 may be connected to clamps 40 via a quick release mechanism, such as a cam mechanism, or alternatively, by one or more threaded knobs 48. The head of knobs 48 may be fabricated in any shape or style, and may include clamping knobs, star knobs, metal knobs, wing screws, rim knobs, and the like.

Arms 20 may be permanently or temporarily connected to rear bracket 60. In one embodiment, arms 20 are connected to rear bracket 60 by welding the components together. In another embodiment, arms 20 are connected to rear bracket 60 by bolting the components together. In another embodiment, arms 20 are connected to rear bracket 60 by snapping the two parts together to enable quick disassembly of the components. In another embodiment, arms 20 are connected to rear bracket 60 using a quick-release mechanism to enable quick disassembly of the components. To streamline a bicycle or to minimize theft, a user may quickly remove arms 20 as well as all components attached or tethered to arms 20 from clamps 40, leaving clamps 40 secured, for example, to the handlebars of a bicycle. Rear bracket 60 may be snapped into place onto arms 20 and held in place by a recess, detent, ledge, or other holding mechanism until such time as a user chooses to disassemble the components. In the embodiment shown in the FIGS. 4-5, each of arms 20 include protrusion 26 extending vertically from a forward end of each arm 20. Protrusion 26 may be configured to be received by receptacle 76 on rear bracket 60. Receptacle 76 may be disposed on arm 34, which may cantileverly extend at least partially rearwardly from rear bracket 60. In one embodiment, arm 34 extends from middle wall portion 64 of rear bracket 60. Protrusion 26 may cantileverly extend from arm 20. Receptacle 76 may include slot 78 to permit extension 28 of protrusion 26 to slidingly couple with receptacle 76.

Figure 4:
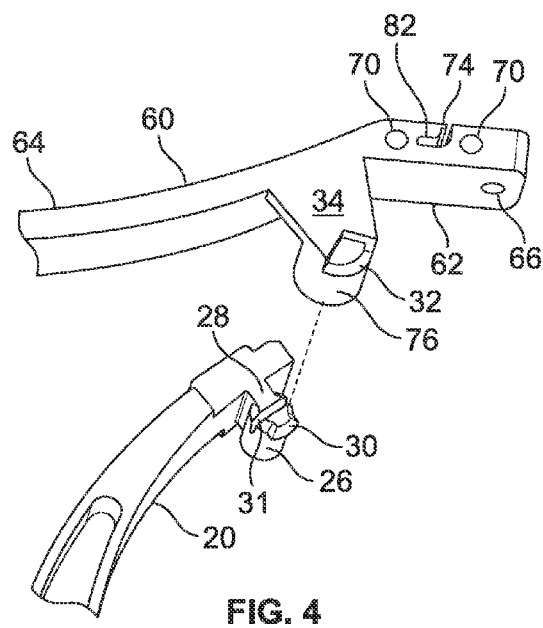
FIG. 4 illustrates a top rear exploded detail view of a portion of the handlebar bag apparatus of FIG. 2.
Figure 5:
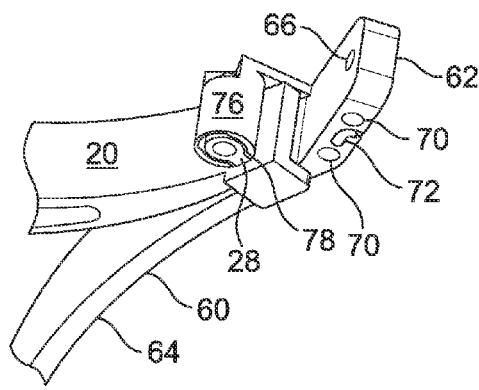
FIG. 5 illustrates a bottom rear detail view of a portion of the handlebar bag apparatus of FIG. 2.
Figure 6:
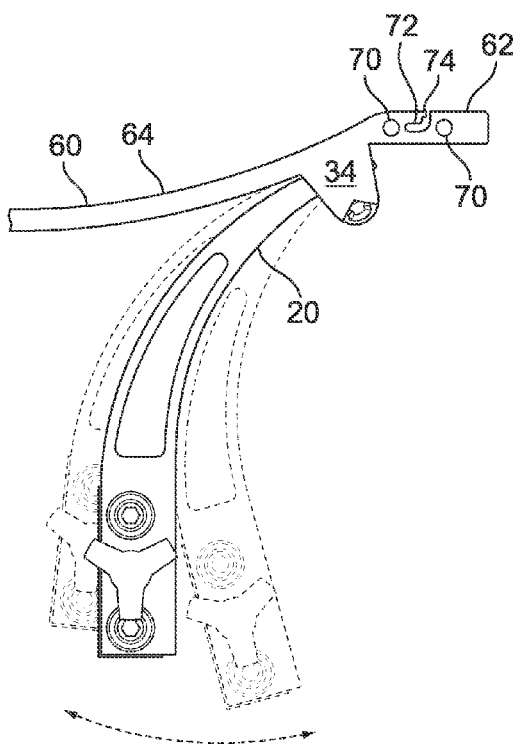
FIG. 6 illustrates a top detail view of a portion of the handlebar bag apparatus of FIG. 2.

To detachably secure protrusion 26 to receptacle 76, receptacle 76 may include a recess, detent, ledge or other feature for receiving and engaging protrusion 26. In one embodiment, as shown in FIG. 4, overhang 30 may be formed along the periphery of protrusion 26 for engaging ledge 32 formed in a wall of receptacle 76. As shown in FIG. 5, slot 31 allows overhang 30 to deflect to permit protrusion 26 to be received by receptacle 76 and to permit overhang 30 to thereafter engage ledge 32. As shown in FIG. 6, each of arms 20 may rotate inwardly and outwardly within the clearance formed by extension 28 and slot 78 to provide flexibility to a user to mount arms 20 to clamps 40 or to any other support mechanism.

In one embodiment, arms 20 and rear bracket 60 may be removably connected to one another by inserting protrusion extending from one component into a receiver in the other component and interlocking the protrusion with the receiver to releasably engage the two together.

Turning again to FIGS. 1-3, rear bracket 60 may be configured with flanges 62 for abutting or connecting with flanges 82 of front bracket 80. Rear bracket 60 and front bracket 80 may include middle wall portion 64 and middle wall portion 84, respectively. Middle wall portion 64,84 may be curved, as shown in FIGS. 1-3, to accommodate the carrying of relatively large and round items, such as a basketball, by bag 100. To enhance safety of a rider of the bicycle, front bracket 80 may include reflective item 88 affixed to one or more forward facing surfaces of front bracket 80. If affixed to middle wall portion 84 and if middle wall portion 84 is curved, reflective item 88 may provide reflective properties to viewers observing reflective item 88 at any of a variety of angles.

Figure 7:
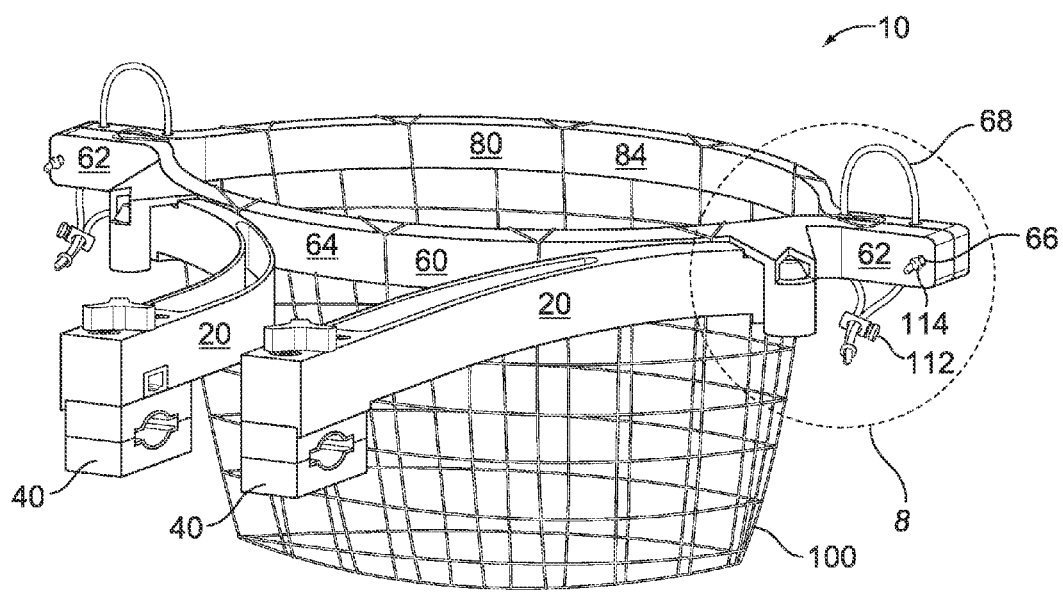
FIG. 7 illustrates a rear perspective view of the handlebar bag apparatus of FIG. 2.
Figure 8:
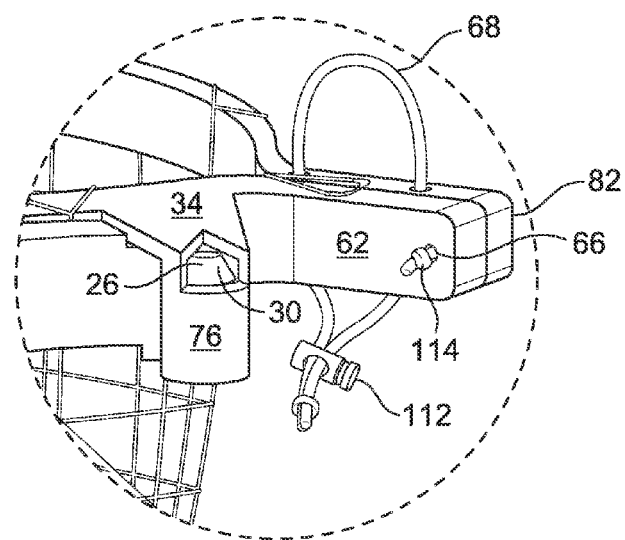
FIG. 8 illustrates a detail view of the handlebar bag apparatus of FIG. 7.

Cord 110 may be used to tether front bracket 80 to rear bracket 60 and to connect front bracket 80 to rear bracket 60. In one embodiment, cord 110 is made from an elastic material. Cord 110 may be inserted through apertures 86 of flanges 82 of front bracket 80 and through apertures 66 of flanges 62 of rear bracket 60. As shown in the embodiment of FIGS. 7-8, respective ends 114 of cord 110 may be knotted or retained on the rear side of flanges 62 of rear bracket 60 to tether front bracket 80 to rear bracket 60. Cinch 112 (see, e.g., FIG. 3) may be used to shorten cord 110 to move front bracket 80 towards rear bracket 60 to help retain one or more items carried in bag 100 or to minimize movement of front bracket 80 relative to, for example, rear bracket 60.

Bag 100 is configured to provide hands-free carrying and transport of one or more items by a rider of a bicycle, including ping pong balls, golf balls, tennis balls, lacrosse balls, softballs, baseballs, play balls, footballs, soccer balls, volley balls, basketballs, frisbees, tools, hardware, gear, groceries, and the like. Bag 100 may be configured as a bag, case, bin, basket, pannier, and the like, or any combination or portion of these.

As shown in FIGS. 1-2, bag 100 includes at least one panel. Bag 100 is suspended by rear bracket 60 and front bracket 80 at respective ends of the at least one panel, thereby forming front panel 104 and rear panel 106. Bag 100 may alternatively be formed from multiple panels, including by connecting front panel 104 with rear panel 106 along a bottom edge, and connecting an end of front panel 104 to front bracket 80 and an end of rear panel 106 to rear bracket 60. Bag 100 may include a bottom panel or may have no bottom panel at all.

Turning to FIG. 3, to removably suspend bag 100 from front bracket 80 and rear bracket 60, grooves 72 and 92 fabricated in flanges 62 and 82 of rear bracket 60 and front bracket 80, respectively, may permit a portion of bag 100 to be looped around grooves 72 and 92 and secured on respective legs 74, 94 formed in flanges 62 and 82. Other means for fastening or joining bag 100 to front bracket 80 and/or rear bracket 60, such as by fasteners, may alternatively be employed.

Bag 100 may have one or more side panels or no side panels at all. Bag 100 having no side panels maximizes the opening of bag 100 when front bracket 80 is moved away from rear bracket 60. When front bracket 80 is moved to the fullest extent permitted by cord 110, bag 100 appears as a generally flat sheet or panel. If front bracket 80 is brought closer to rear bracket 60, the bottom inflection formed at the interface of front panel 104 and rear panel 106 drops due to gravity. In this situation, cord 110 acts as a virtual side wall on both side ends of bag 100 to retain relatively large items in bag 100, such as a basketball.

Figure 9:
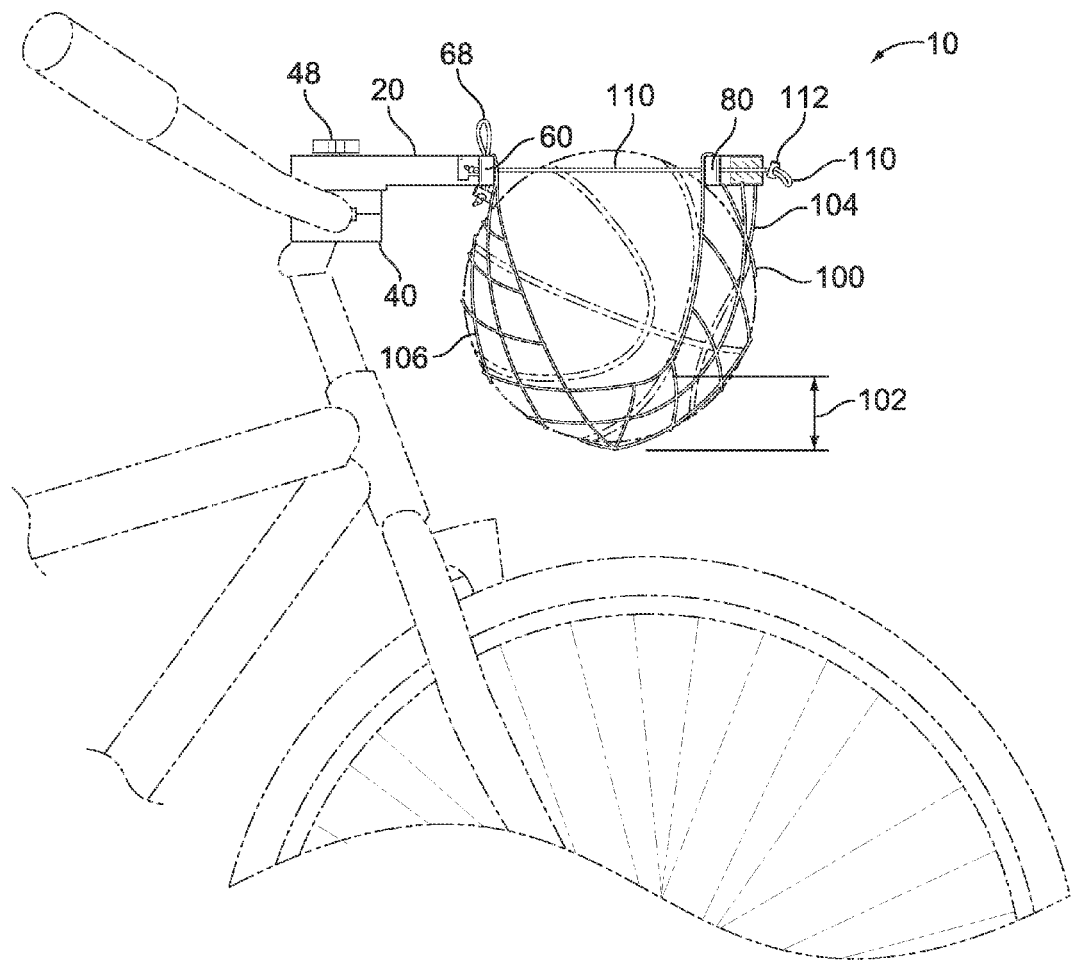
FIG. 9 illustrates a left side view of the handlebar bag apparatus of FIG. 2 in use.

In one embodiment, as shown in FIGS. 1-2 and 9, bag 100 includes partial side panels 102 positioned at or near the bottom of bag 100 to at least partially connect side edges of front panel 104 to respective side edges of rear panel 106 along the sides of bag 100 to help prevent small objects from exiting the sides of bag 100 during use. Partial side panels 102 allow bag 100 to generally be open on its sides to provide flexibility to bag 100 to accommodate a variety of differently sized and shaped items to be carried by allowing front bracket 80 to be movable toward and away from rear bracket 60 while front bracket 80 remains tethered to rear bracket 60.

In another embodiment, bag 100 include a slab of hook and loop fastener material, such as Velcro®, movably positioned along adjacent side edges of the front panel 104 and rear panel 106. The slab of hook and loop fastener material may connect a side edge of front panel 104 with an adjacent side of rear panel 106 to form at least a partial side wall of bag 100 to aid in retaining small items within bag 100.

Bag 100 having generally open sides and with or without partial side panels 102 can hold and retain relatively small objects during use, such as something as small or smaller than a golf ball or ping ball, because bag 100 may tend to move or shift from side to side or up and down along with the objects being carried, as when the bicycle enters and exits a turn or when the bicycle is jostled by the roadway. For example, bag 100 may be flexible to accommodate items having a variety of different sizes and to move with the carried items during use. Flexibility of bag 100 may also permit one or more panels to move side-to-side, forwardly, rearwardly, and/or torsionally as dictated by a user's movements of a bicycle. As such, items carried therein may remain upright, remain seated, or otherwise captured within respective panels 104,106 and 102 (if present) of bag 100 according to the sum of forces acting upon bag 100 and/or such items.

Although bag 100 is shown in the figures as fabricated from a netting material, which may vary in form, geometry, and density of the mesh, one or more panels of bag 100 may alternatively be fabricated in the form of a sheet, such as a fabric. If bag 100 includes net or net-like material having openings in the one or more panels, the openings may include any geometrical shape. In one embodiment, bag 100 includes a mesh having generally square openings, each having an area of between 0.1 square inch and approximately 2 square inches. In another embodiment, bag 100 includes a mesh having generally diamond openings, each having an area of between 0.1 square inch and approximately 2 square inches.

Bag 100 may be fabricated from organic or inorganic materials, including a nylon or other plastic or a composite. Bag 100 may include wound or interwoven fibers, including composite fibers. If configured in the form of netting, bag 100 may provide reduced aerodynamic drag during use to minimize wind-induced movement of bag 100 and its contents. Bag 100 may have elastic properties to provide additional flexibility and resiliency of bag 100.

As shown in FIGS. 1 and 9, when cord 110 is extended to a longer length by releasing cinch 112, front bracket 80 may be allowed to move away from rear bracket 60 to permit a user to place one or more items in or remove one or more items from bag 100. Upon releasing cinch 112, because front bracket is not rigidly supported by cord 110, front bracket 80 naturally moves away from rear bracket 60 under its own weight and the weight of any items already carried in bag 100. To secure the item or items in bag 100, a user may shorten cord 110 using cinch 112 to bring front bracket 80 towards rear bracket 60. Depending on the volume or size of items carried in a particular instance by bag 100 relative to the volume or size of bag 100, flanges 82 of front bracket 80 may or may not fully mate with flanges 62 of rear bracket 60 but may still carry and retain the item in bag 100 during use. As shown in FIG. 9, carrying relatively large objects, such as a basketball, may cause front bracket 80 to be disposed away from rear bracket 60 while retaining the object.

Figure 10:
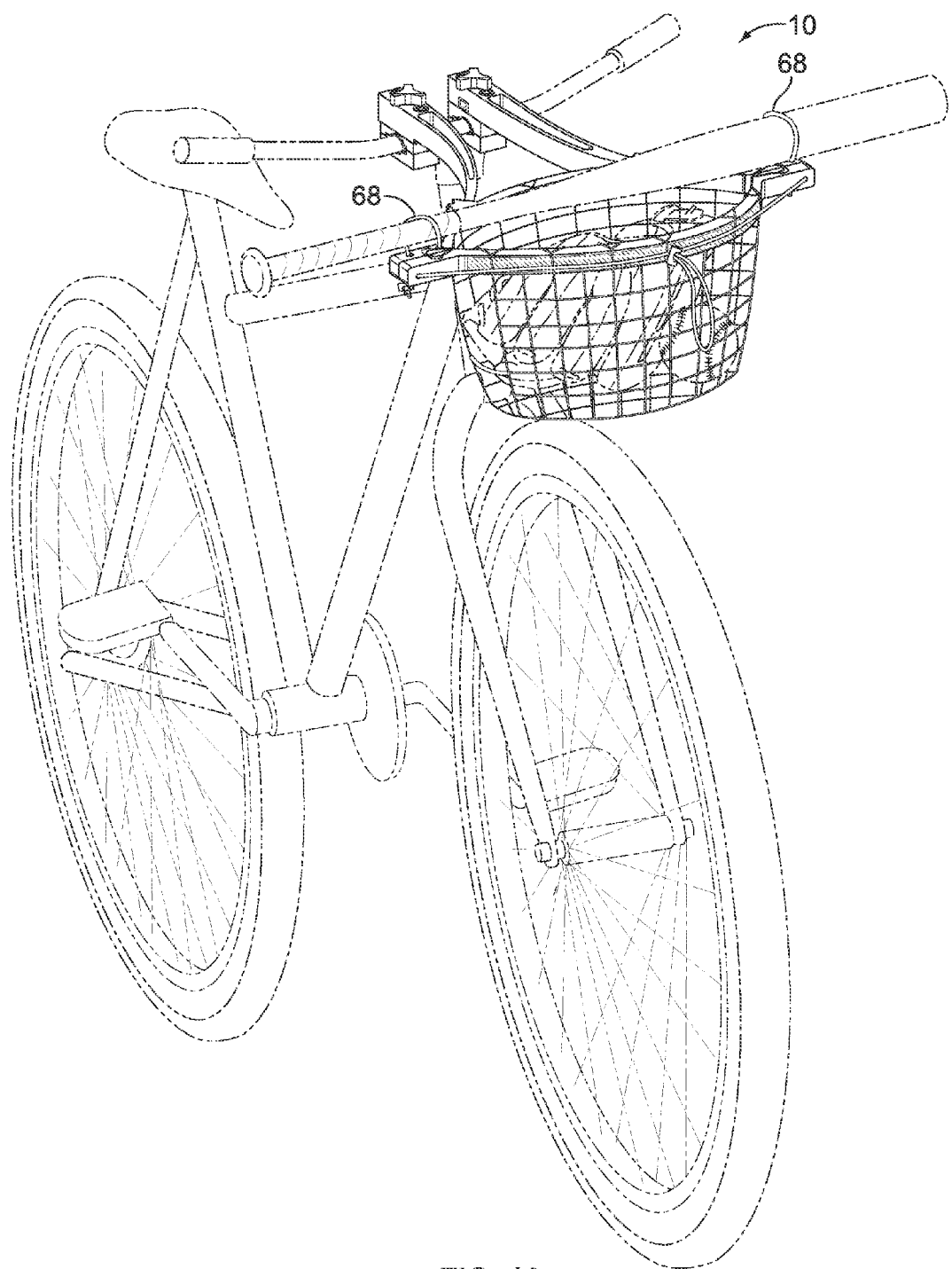
FIG. 10 illustrates a front perspective view of the handlebar bag apparatus of FIG. 2 in use.

Referring to FIGS. 7-8, rear bracket 60 of handlebar bag apparatus 10 may include one or more cords 68 looped through apertures 70 (see, e.g., FIGS. 4-6) positioned on a side of respective flanges 62 or on middle wall portion 64 and tied or secured on another side of flanges 62 or middle wall portion 64. Apertures 70 are through holes positioned through flanges 62. Cord 68 may be made from an elastic material. As best shown in FIG. 10, the loop of cord 68 may be configured to hold relatively long items such as baseball bats, golf clubs, tennis rackets, lacrosse rackets, and skateboards (by looping around the wheels, for example).

Figure 11:
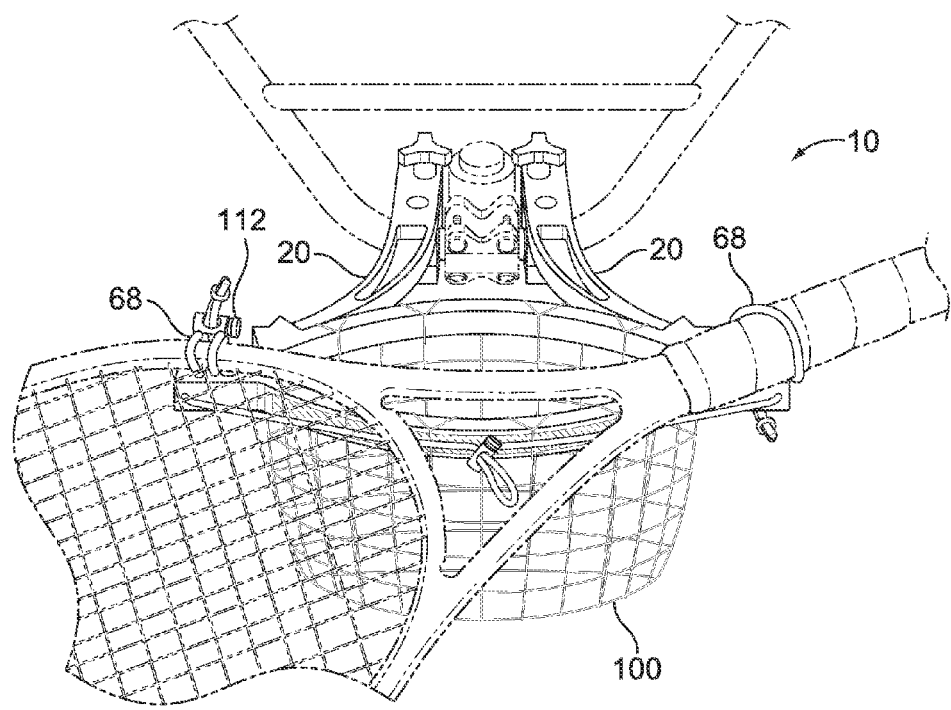
FIG. 11 illustrates a front perspective view of the handlebar bag apparatus of FIG. 2 in use.
Figure 12:
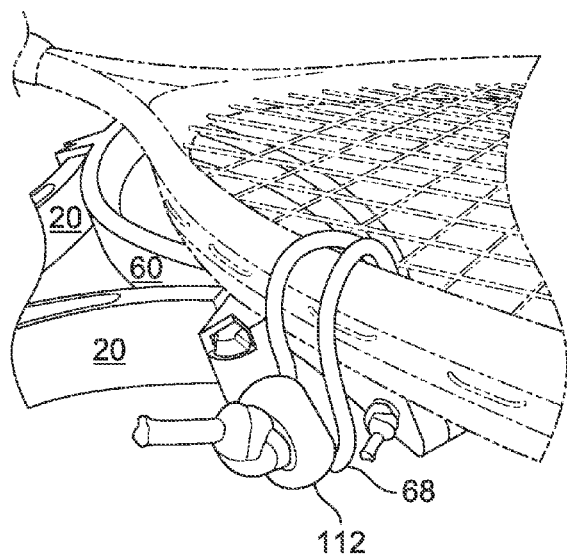
FIG. 12 illustrates a side detail perspective view of a portion of the handlebar bag apparatus of FIG. 11.

To secure an item within the loop of cord 68, an end of cord 68 may include cinch 112 to permit a user to lengthen or shorten the length of cord 68 to suit a particular item. In another method of use, as shown in FIGS. 11-12, a loop of cord 68 may be passed through, for example, strings of a tennis racket and looped around cinch 112. In this way, handlebar bag apparatus 10 may hold and retain one or more items in bag 100 and one or more items laid along at least a portion of rear bracket 60 to free a bicycle rider from having to carry the item or items in an arm or hand.

Turning again to FIG. 10, when mounted to clamps 40, arms 20 may extend beyond any brake cables to avoid interference with the bicycle's braking system. In addition, bag 100 may be configured to avoid interference with the front tire of the bicycle by sizing bag 100 appropriately and by shortening cord 110 to the extent possible using cinch 112.

Referring again to FIG. 1, to secure handlebar bag apparatus 10 to a bicycle handlebar, clamps 40 may include top portion 42 and bottom portion 44 configured in the form of a clamshell and arranged on opposite sides of a portion of the handlebar tube. In another embodiment, clamps 40 may include a single clamp to support arms 20, rear bracket 60, front bracket 80, and bag 100. In one embodiment, an embodiment of clamps 40 may be installed on a horizontal section of the handlebars. In another embodiment, an embodiment of clamps 40 may be installed on a vertical section of the handlebars.

Figure 13:
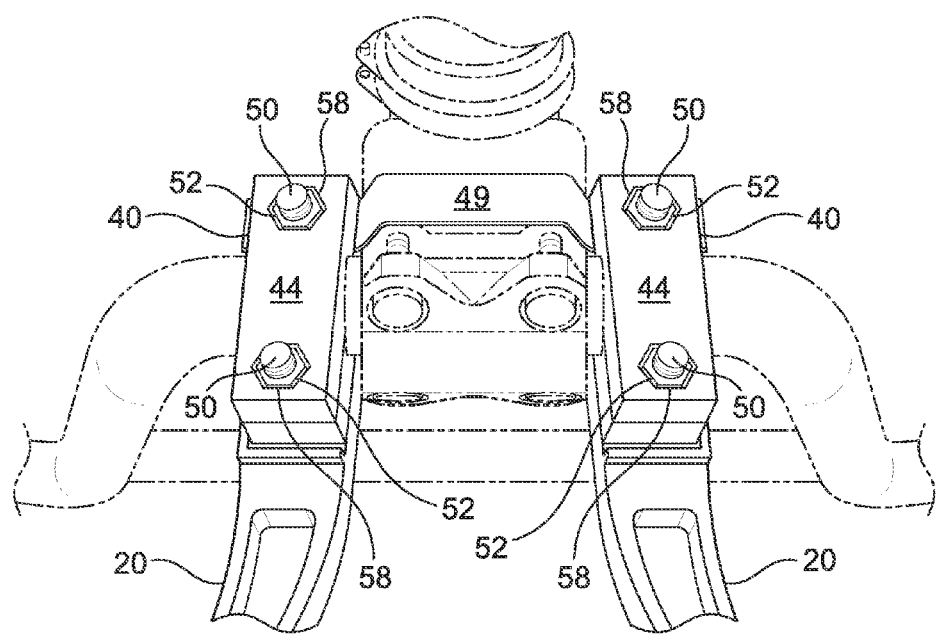
FIG. 13 illustrates a bottom detail view of a portion of the handlebar bag apparatus of FIG. 2 including an anti-rotation strap.

Although top portion 42 is shown in the figures as being a separate component from bottom portion 44, these items may alternatively be configured as a single component that wraps around or is otherwise secured to the handlebar tube. Top portion 42 and bottom portion 44 may be releasably connected together around the handlebars using a quick-release mechanism. Alternatively, as shown in FIG. 1, threaded fasteners 50 and nuts 52 may be used together to connect top portion 42 with bottom portion 44. Fasteners 50 may be passed through apertures 54,55 in top portion 42 and bottom portion 44. In the embodiment shown in FIG. 13, nuts 52 may be positioned in respective recesses 58 on the bottom surface of bottom portion 44 to receive and secure fasteners 50 to help a user install clamps 40 to a handlebar tube. Recesses 58 may be configured in any geometrical shape, such as a hexagon, to approximate the geometrical shape of nuts 52 to provide anti-rotation functionality to nuts 52. In other embodiments, a quick release mechanism, such as a cam mechanism, may be used to join top portion 42 with bottom portion 44. In another embodiment, to avoid requiring nuts 52, threaded apertures may be fabricated in bottom portion 44 to receive fasteners 50 if fasteners 50 are installed first through top portion 42. Alternatively, top portion 42 may be fabricated with threaded apertures to receive fasteners 50 installed first through bottom portion 44.

To further secure handlebar bag apparatus 10 to the handlebars of a bicycle and to add redundancy to clamps 40, anti-rotation strap 49 may be positioned under the "chin" or "knuckle" formed at the junction between the handlebars and the stem of the fork of the bicycle. In one configuration, the respective ends of anti-rotation strap 49 may be sandwiched between top portion 42 and bottom portion 44 of respective clamps 40 while the center portion of anti-rotation strap 49 is configured to lie underneath and in close proximity with the handlebar/stem "knuckle" along the front face of the stem. To secure anti-rotation strap 49 to clamps 40, anti-rotation strap 49 may include spaced apart through-holes to adjustably position the strap underneath the handlebar/stem "knuckle" and to receive a fastener 50 therethrough in each of the two clamps 40. Anti-rotation strap 49 may be configured to be cinched snuggly against the "knuckle." When mounted underneath the "knuckle" in front of the stem and secured to clamps 40, anti-rotation strap 49 provides a redundant means to secure handlebar bag apparatus 10 to the handlebars of a bicycle, particularly in the event of a failure of one or both of clamps 40 to prevent rotation of handlebar bag apparatus 10 when loaded with items. Anti-rotation strap 49 also provides a secondary means to counteract torque induced by cantileverly carrying a load in bag 100 and promotes load sharing with clamps 40. Anti-rotation strap 49 additionally may assist a user to align respective clamps 40 when mounting handlebar bag apparatus 10 to the handlebars of a bicycle. Anti-rotation strap 49 may comprise a reinforced or heavy duty fabric, a rubber, a plastic, a composite, a metal, or any combination of these.

Figure 14:
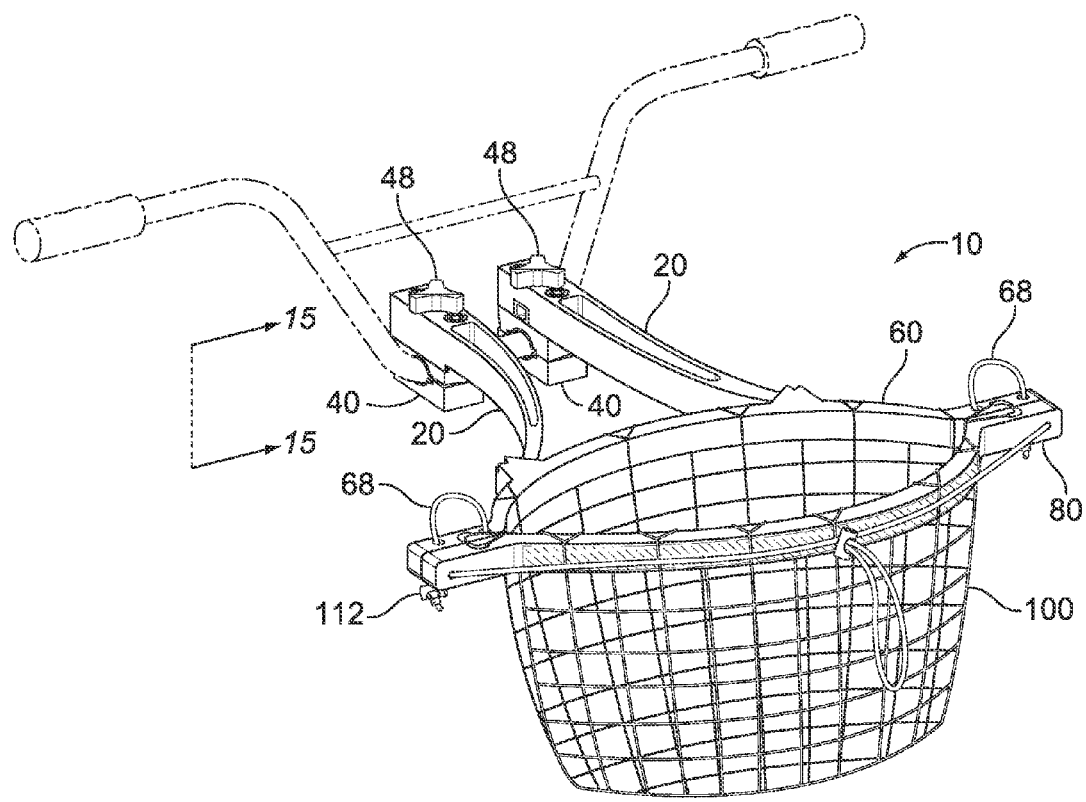
FIG. 14 illustrates a front perspective view of the handlebar bag apparatus of FIG. 2 in use.
Figure 15:
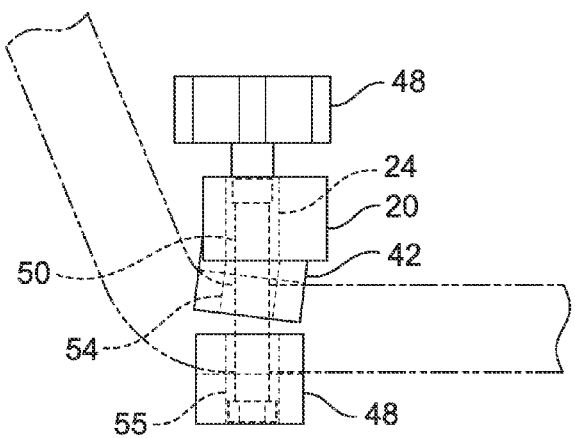
FIG. 15 illustrates a side detail view of a portion of the handlebar bag apparatus of FIG. 14.

As shown in FIGS. 14-15, clamps 40 may be positioned along a generally horizontal section of the handlebars, such as on opposite sides of the handlebar stem of the bicycle. In some situations, the width of the horizontal section of the handlebar tube may not be as wide as may be desired to accommodate a desired spacing of arms 20. In this case, clamps 40 may be configured to include additional internal clearance between fasteners 50 in apertures 54,55 to permit significant angular adjustment of top portion 42 relative to bottom portion 44 of clamps 40. When secured to the handlebars, clamps 40 are each configured to resist all rotational forces generated by cantileverly carrying a load in bag 100.

Figure 16:
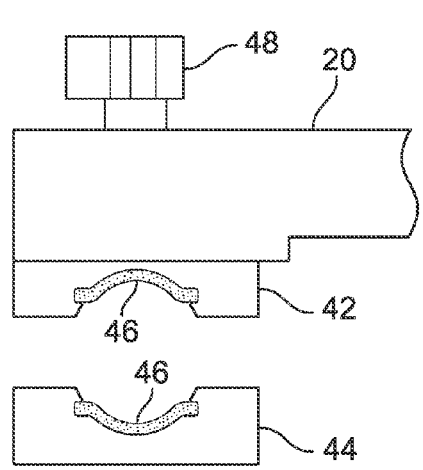
FIG. 16 illustrates a side detail view of a portion of the handlebar bag apparatus of FIG. 2.
Figure 17:
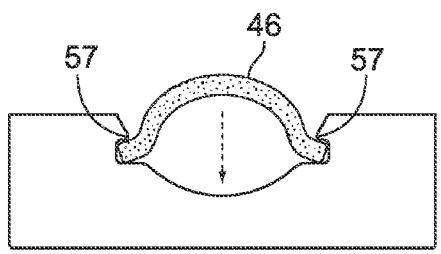
FIG. 17 illustrates a side detail view of a portion of the handlebar bag apparatus of FIG. 2.
Figure 18:
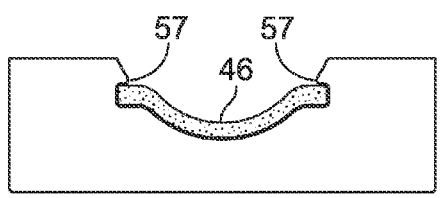
FIG. 18 illustrates a side detail view of a portion of the handlebar bag apparatus of FIG. 2.

Turning to FIGS. 16-18, to help ensure that clamps 40 may be secured to a handlebar, clamps 40 may include grip 46 positioned on inside surfaces of top portion 42 and bottom portion 44. Grip 46 is configured to increase friction against the handlebars to enable clamps 40 to counteract and/or resist any torque generated by cantileverly carrying a load in bag 100. Grip 46 may be formed from a rubber or any material that reduces the likelihood for relative motion between clamps 40 and the handlebar tube. Grip 46 may be positioned under and captured by lip 57.

Figure 19:
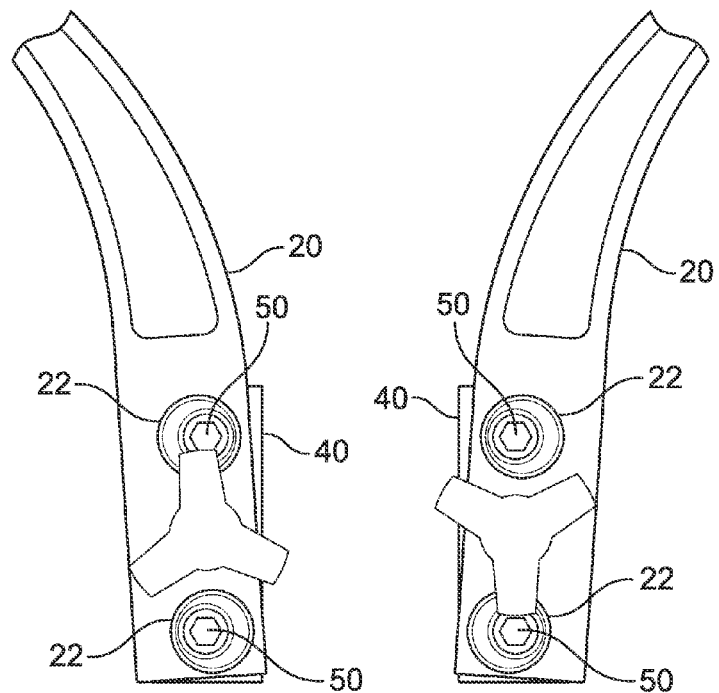
FIG. 19 illustrates a top detail view of a portion of the handlebar bag apparatus of FIG. 2.

Arms 20 may be positioned on a top surface, for example, of top portion 42 of clamps 40 and connected to clamps 40. As discussed above, arms 20 may be optionally connected to clamps 40 via threaded knobs 48, which permit removal of arms 20 from clamps 40 as desired by a user without requiring removal of clamps 40 from their mounted location on a handlebar. Knobs 48 may be inserted through clearance apertures 24 in arms 20 and threaded into respective threaded apertures 43 in top portion 42 of clamps 40. As shown in FIG. 19, arms 20 may include clearance apertures 22 to provide clearance to the heads of fasteners 50 in the event top portion 42 does not include a counterbore for the heads to account for angular or orientational differences of clamps 40 positioned on a handlebar tube and to ease assembly of arms 20 with rear bracket 60. In one embodiment, arms 20 may extend forwardly from clamps 40 to support rear bracket 60, front bracket 80, and bag 100. In another embodiment, arms 20 may extend forwardly or rearwardly from a support connected to a portion of the frame of the bicycle to support rear bracket 60, front bracket 80, and bag 100. In addition to the embodiments shown in the figures, in another embodiment, a support structure may permit a flexible bag of construction similar to bag 100 to be suspended from a structure extending rearwardly from, for example, the seat post.

Figure 20:
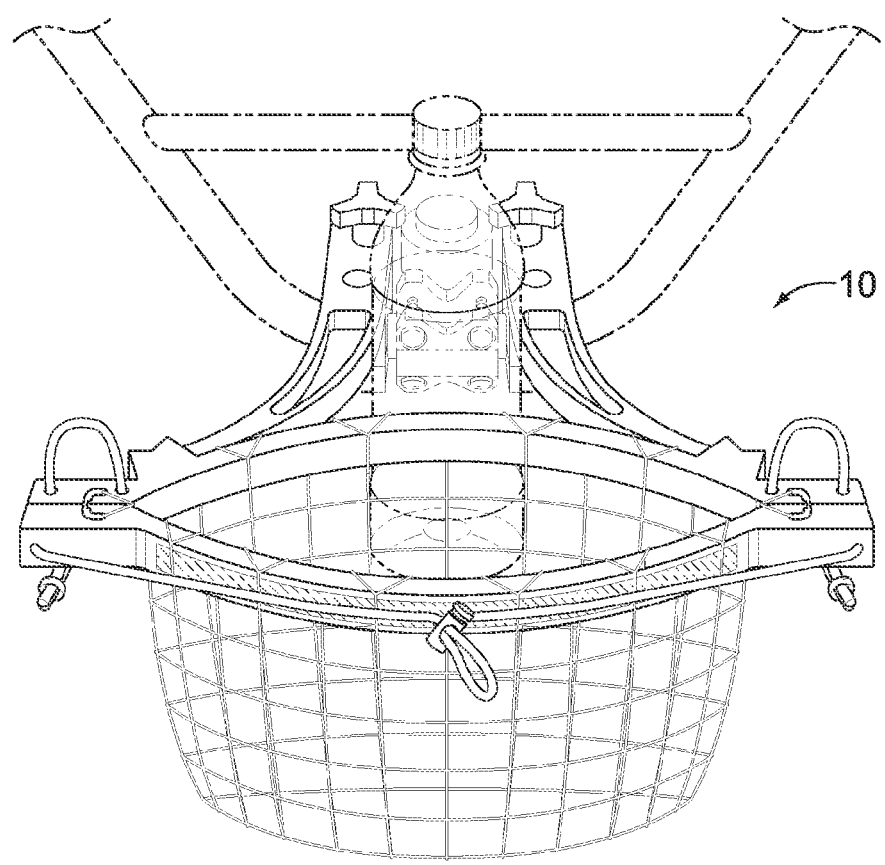
FIG. 20 illustrates a front perspective view of the handlebar bag apparatus of FIG. 2 in use.

Turning to FIG. 20, handlebar bag apparatus 10 may be configured to carry a beverage container, such as a water bottle. In one embodiment, a base may be positioned between and below respective arms 20 to form a base for supporting the beverage container and for nesting the beverage container between arms 20. The base may be connected to respective arms 20 or to rear bracket 60. In one embodiment, the beverage container may be nested between arms 20 and rear bracket 60.

Handlebar bag apparatus 10 may be fabricated to minimize weight, maximize strength and rigidity, and minimize cost to the consumer. One or more of the components of handlebar bag apparatus 10, such as arms 20, rear bracket 60, and/or front bracket 80 may be made from one or more types of materials, such as polyethylene, high density polyethylene, polypropylene, ABS, nylon, recycled polymers including post-consumer resin (PCR), fiberglass, and composites, among others. In one embodiment, the material used to fabricate one or more components of handlebar bag apparatus 10 may include approximately 10% glass filled fiber. Glass filled fiber or other additives may be included in varying amounts depending on the balance of cost and desired rigidity of the finished product.

While specific embodiments have been described in detail, it will be appreciated by those skilled in the art that various modifications and alternatives to those details could be developed in light of the overall teachings of the disclosure. Accordingly, the disclosure herein is meant to be illustrative only and not limiting as to its scope and should be given the full breadth of the appended claims and any equivalents thereof.

What is claimed is:
1. A carrier apparatus for attachment to a bicycle, comprising:
    a flexible receptacle including a flexible panel having a first end and a second end, the first end connected to a first support, the second end connected to a second support, the panel suspended from the first and second supports, the panel comprising respective opposing side edges defining spaced apart open side ends of the receptacle; and a resilient member connecting the second support to the first support, wherein the second support is tetheringly movable toward and away from the first support to vary an opening of the receptacle.

2. The apparatus of claim 1, wherein the receptacle responds to motion so as to maintain the carrying of any items by the receptacle during use.

3. The apparatus of claim 1, wherein the panel includes a net.

4. The apparatus of claim 3, wherein the net includes a plurality of apertures, wherein at least a portion of the plurality of apertures is smaller than a diameter of a golf ball.

5. The apparatus of claim 1, wherein the first support and the second support each include a curved portion connecting a flange positioned at respective ends of the first support and the second support.

6. The apparatus of claim 5, wherein the curved portion of the first support and the curved portion of the second support are oriented outwardly and in opposite directions to one another, wherein a minimum opening to the receptacle is formed by the respective curved portions of the first and second supports when respective flanges of the first support are positioned adjacent to respective flanges of the second support via the resilient member.

7. The apparatus of claim 5, including a second resilient member attached to each flange of the first support for releasably and adjustably securing an item to and longitudinally along the first support.

8. The apparatus of claim 5, wherein the curved portion of the second support includes a reflector positioned along an outer surface of the curved portion of the second support for enhancing rider safety during use, wherein the reflector reflects light within at least a subtending angle corresponding to an arc length of the reflector on the curved portion of the second support.

9. The apparatus of claim 1, including at least one bracket cantileverly extending from and supporting the first support to provide clearance between the receptacle and the bicycle during use.

10. The apparatus of claim 9, including a clamp releasably connected to and supporting the at least one bracket.

11. The apparatus of claim 10, wherein the clamp includes a first quick-release mechanism for quickly mounting and demounting the at least one bracket.

12. The apparatus of claim 10, wherein the clamp includes a second quick-release mechanism for quickly mounting and demounting the clamp to and from the bicycle.

13. The apparatus of claim 10, wherein the clamp comprises a clamshell including a top portion and a bottom portion for securely mounting to the bicycle.

14. The apparatus of claim 1, wherein the suspended panel includes a lower transition portion and a selectably sized side wall portion defined by a slab of hook and loop fastener material movably positioned along a side edge of the panel proximate the lower transition portion.

15. A carrier apparatus for attachment to a bicycle, comprising:
a first panel suspended from a first support that is adapted to be cantileverly connected to the bicycle;
a second panel suspended from a second support opposite the first support, the second panel connected to the first panel, the first panel and the second panel comprising a receptacle for carrying an item, the receptacle comprising respective opposing side edges defining spaced apart open side ends; and a resilient member connecting the second support to the first support, wherein the second support is tetheringly movable toward and away from the first support to variably open and close the receptacle.

16. The apparatus of claim 15, wherein the receptacle moves in tandem with the item carried therein in response to motion induced by the bicycle during use so as to maintain the carrying of the item by the receptacle.

17. The apparatus of claim 15, wherein the resilient member includes a cinch for selectively shortening and lengthening a position of the second support relative to the first support.

18. A carrier apparatus for attachment to a bicycle, the apparatus configured to hold a plurality of items, comprising:
a receptacle suspended from a fixed rear support and a movable front support, the receptacle including a panel having a rear end connected to the rear support and a front end connected to the front support to cause the receptacle to be suspended therefrom, the panel comprising respective opposing side edges defining spaced apart open side ends of the receptacle; and
a cord member connecting the front support to the rear support, wherein the front support is tetheringly movable toward and away from the rear support,
wherein the receptacle moves in tandem with any items contained therein in response to motion of the bicycle so as to maintain the carrying of the items by the receptacle during use.

19. The apparatus of claim 18, including a resilient member attached to the rear support, the resilient member including a cinchable loop for releasably and adjustably securing a sporting goods item to the rear support.

20. A carrier apparatus for attachment to a bicycle, comprising:
a flexible receptacle including a flexible panel having a first end and a second end, the first end connected to a first support, the second end connected to a second support, the panel suspended from the first and second supports; and
a resilient member connecting the second support to the first support, wherein the second support is tetheringly movable toward and away from the first support to vary an opening of the receptacle,
wherein the first support and the second support each include a curved portion connecting a flange positioned at respective ends of the first support and the second support.

21. The apparatus of claim 20, wherein the curved portion of the first support and the curved portion of the second support are oriented outwardly and in opposite directions to one another, wherein a minimum opening to the receptacle is formed by the respective curved portions of the first and second supports when respective flanges of the first support are positioned adjacent to respective flanges of the second support via the resilient member.

22. The apparatus of claim 20, including a second resilient member attached to each flange of the first support for releasably and adjustably securing an item to and longitudinally along the first support.

23. The apparatus of claim 20, wherein the curved portion of the second support includes a reflector positioned along an outer surface of the curved portion of the second support for enhancing rider safety during use, wherein the reflector reflects light within at least a subtending angle corresponding to an arc length of the reflector on the curved portion of the second support.

* * * * *